US005315879A

United States Patent [19]

Crochon et al.

[11] Patent Number: 5,315,879

[45] Date of Patent: May 31, 1994

[54] APPARATUS FOR PERFORMING NON-DESTRUCTIVE MEASURMENTS IN REAL TIME ON FRAGILE OBJECTS BEING CONTINUOUSLY DISPLACED

[75] Inventors: Michel Crochon, Aix-en-Provence; Véronique F. Bellon, Montpellier, both of France

[73] Assignee: Centre National du Machinisme Agricole du Genie Rural des Eaux et des Forets CEMAGREF, Antony, France

[21] Appl. No.: 922,626

[22] Filed: Jul. 30, 1992

[30] Foreign Application Priority Data

Aug. 1, 1991 [FR] France ................................ 91 10098

[51] Int. Cl.$^5$ ................................................ G01N 3/40

[52] U.S. Cl. ........................................... 73/818; 73/81; 209/699

[58] Field of Search ........................... 73/818, 824, 81; 209/599, 699, 701

[56] References Cited

U.S. PATENT DOCUMENTS 1,849,055 3/1932 Cropper ............................ 73/818 X
3,470,737 10/1969 Fridley ............................ 73/818 X
3,744,628 7/1973 Holcombe et al. .................. 209/90
4,511,046 4/1985 Walsh et al. ........................ 209/539
4,555,028 11/1985 Valehrach ........................... 209/599

FOREIGN PATENT DOCUMENTS 8908510 9/1989 World Int. Prop. O. .......... 209/539

*Primary Examiner*—Jerry W. Myracle
*Attorney, Agent, or Firm*—Ladas & Parry

[57] ABSTRACT

The field of the invention is that of manufacturing non-destructive measurement equipment suitable for fitting to devices for handling and conveying objects on a continuous basis, e.g. for the purpose of monitoring the ripeness and/or the dimensions of fruit and vegetables. The invention provides apparatus for non-destructive measurement in real time of fragile objects moving continuously on a conveyor system of the type including object-receiving cells in which said objects are placed and conveyed one by one along a given directional plane. The apparatus includes at least one support arm hinged at one end and carrying a shoe at its other end, with the bottom surface of the shoe being cylindrical in shape having generator lines that are perpendicular to said plane. Each of said objects rolls beneath and against said surface with relative rotary motion, and at least one sensor performs a non-destructive measurement of a parameter of each of said objects.

10 Claims, 3 Drawing Sheets

APPARATUS FOR PERFORMING NON-DESTRUCTIVE MEASURMENTS IN REAL TIME ON FRAGILE OBJECTS BEING CONTINUOUSLY DISPLACED

DESCRIPTION

The invention relates to apparatus for performing non-destructive measurements in real time on fragile objects while they are being continuously displaced.

The field of the invention is manufacturing equipment for performing non-destructive measurements and suitable for use with devices for handling and conveying objects continuously.

One of the main applications of the invention is to make it possible to measure the characteristics of fruit and vegetables automatically, in particular such as monitoring ripeness and/or size, so as to be able to sort them and separate them into different predetermined categories.

BACKGROUND OF THE INVENTION

Different types of non-destructive measuring system are known that are adapted to the natures of different types of object, however each system is often specific, either as to the type of measurement that is desired or else to the type of object that is under consideration.

Destructive measurement systems are set aside and are not considered in the present invention since one of the objects of the invention is to be able to determine the characteristics of objects for the purpose of sorting them: since destructive measurements can naturally only be performed on samples, they cannot achieve this object.

For measuring dimensions, mention may be made of various means, essentially such as those that make use of optical sensors: specific examples include firstly French patent 1 458 715 filed by the firm Fairbanks Morse on Oct. 7, 1965 claiming US priority and describing a frame having a light grid through which each object passes, thereby intersecting the beams and obscuring cells situated on the axis of the beams, and secondly PCT application WO 90/04803 filed Sep. 28, 1990 by the Australian firm Colour Vision Systems Ltd., describing a device including an array camera and an image analyzer.

For measuring the firmness of objects, numerous sensors are known that serve, in fact, to measure the hardness of the objects, essentially by measuring a displacement or a deformation of a known surface subjected to a given force: when the object is fragile, none of these sensors can be used directly because of the risk of damaging the object.

In the main application of the present invention, mention may be made, by way of example, of three systems adapted to fruit:

An article by Mr. John S. Perry published in "Transactions of the ASAE" (American Society of Agricultural Engineers), 1977, 20/4, pp. 762-767, which teaches a device into which air is delivered at a given pressure and a deformation is measured. That device is nevertheless unsuitable for in-line measurements since the method takes time and requires very good contact between the instrument and the fruit. If it is desired to perform measurements on a line operating at a high rate, there is a risk of the objects rubbing against the surfaces subjected to pressure, thereby damaging the surfaces of said objects.

An article by J. J. Mehlschau et al. in another "Transactions of the ASAE", 1981, 24.05, pp. 1368-1375, teaches an in-line sensor for pears, the sensor including horizontal wheels applied laterally against the pears as they go past, which wheels are subjected to a given force. The problem with that system is the residual bruising that remains after the measurement and which has the appearance of a rail in fruit that is rather ripe.

An article by J. E. Mattus described in a publication of the "American Society for Horticultural Science", 1967, Vol. 87, pp. 100-103, teaches a "mechanical thumb" based on the principle of a penetration meter having a tip that is smaller than the tips used in destructive testing. That system requires a measurement time that is quite long since the fruit must initially be pressed against a hard surface and then the sensor must be applied at right angles which means that the measurement cannot be performed in real time on a line, at least not without accepting a loss of reliability in the measurement and an increase in the risk of damage by contact with the surface of the object.

The first two systems described above may also be used for measuring the diameters of fruit. Other systems may also be mentioned using other means for measuring ripeness and/or firmness, e.g. by vibration and propagation of sound, or by analyzing the way light is transmitted and/or absorbed, or on the basis of the overall color of the fruit, but the results are not very accurate and do not enable reliable and repetitive measurements to be performed to enable sorting to be performed continuously with better than 80% good results, and that is one of the essential objects of the present invention.

It may be mentioned that numerous equipments, tests, and publications have been, and are still being, developed for determining a criterion of fruit ripeness. Patent applications have been made in respect of some of them, essentially for automatically measuring firmness which is the factor most representative of ripeness, and for the purpose of replacing human judgement which is tedious, subject to error, and expensive.

Commercially, fruit are sorted on the basis of firmness firstly to separate out the ripest and thus the best fruit from the others, thereby sorting for eating quality, and also for separating out fruit more capable of withstanding a long journey from the others, which in the end amounts to sorting for appearance. For example, overripe peaches that have travelled over a long distance do not look inviting on arrival.

For a long time, firmness has been out of favor for in-line applications since the method conventionally used, such as the Magness-Taylor penetration meter, is destructive. It has therefore appeared that a method taking this parameter into account could only be destructive. For measuring dimensions, optical methods have generally been preferred in research, but without achieving results of satisfactory reliability.

Thus, against the usage and practice currently recommended in the profession, the present invention is the result of studies and research on measuring the firmness criterion to enable sorting for two purposes, not only for eating quality, but also for appearance. This criterion appears to be highly pertinent since it makes it possible:

to separate fruit into different classes of eating quality, thus making it possible to offer a "reliable" product to customers;

to make up trays of fruit having uniform firmness, with the harder fruit being suitable for shipping over longer distances; and in the long term, to pay producers as a function of the quality of their fruit, thereby increasing quality levels overall.

None of the presently-available systems, some of which are mentioned above, is capable of measuring this criterion with sufficient reliability while satisfying the objects of the present invention.

In general terms, the problem posed is that of providing apparatus for performing non-destructive measurements of characteristics, such as firmness, but also dimensions, on fragile objects such as fruit of non-uniform sizes while they are being continuously transported by a conveyor system, and for the purpose of being sorted as a function of the results of said measurements so as to be delivered one by one to various outlets each corresponding to criteria for given categories, with the selection success rate being greater than 80% and without significantly damaging or visually marking the surface of the fruit.

SUMMARY OF THE INVENTION

A solution to the problem posed is a measurement apparatus for performing non-destructive measurements on fragile objects of non-uniform size and shape that are generally in the form of bodies of revolution about at least one axis and that are moving continuously on a conveyor system of the type including object-receiving cells in which said objects are placed and driven one by one along a given directional plane, the apparatus including at least one support arm which is stationary and hinged at one end, a shoe secured to the other end of said arm and having a bottom surface in the form of a cylinder whose generator lines are perpendicular to said plane, extending on either side thereof and situated above the conveyor system, such that each of said objects lifts the shoe and rolls by relative rotary motion beneath and against said surface, and at least one sensor enabling a non-destructive measurement to be performed of a parameter of each of said objects as it moves past beneath said shoe.

In a preferred embodiment, the conveyor system comprises an endless chain constituted by waisted cylinders which rotate in the same direction as their drive direction, with the gaps between the cylinders constituting said cells receiving the objects, the objects thus being advanced and being rotated in the opposite direction to their direction of advance, said shoe being fixed relative to said arm, and the speed of advance and the speed of rotation of the cylinders being such that each object rolls against the surface of the shoe.

By way of example, the apparatus of the invention may include a sensor for measuring the position of the support arm relative to the drive plane of the conveyor system, a calculation unit receiving the signal from said sensor and serving to deduce the maxmum height to which said shoe is raised each time an object goes past it, thereby making it possible to deduce the diameter thereof.

In another important example of measurement, the apparatus includes a deformation sensor situated in said shoe and having an active portion that projects on its own from said surface.

In another preferred embodiment, the apparatus includes at least two support arms fitted with respective shoes, and at least one measurement sensor each, said arms being disposed along the conveyor system at distances apart such that the rotation of said objects while travelling said distances ensures that different portions of their surfaces roll against at least two of said shoes.

The result is novel apparatuses for performing non-destructive measurements on fragile objects being displaced continuously, and in particular for use with fruit.

These apparatuses overcome the various drawbacks mentioned above with respect to previously known systems, and then are vary easily adapted to existing conveyor systems, in particular those which already rotate the objects being conveyed in the opposite direction to the conveying direction, even when that is done for different reasons relating to the need to drive the objects one by one. This is done by means of drive cylinders that are waisted, which shape also makes it possible to accept objects of different diameters which then automatically center themselves in the midplane of said waisted cylinders, with the gaps between them constituting the reception cells.

Such systems are in wide use upstream from means for automatically sorting fruit that may be thought of as being approximately bodies of revolution, and operated in the past on the sole criterion of weight, or possibly of volume, thereby requiring the fruit to be driven one by one and from which their outside dimensions and caliber are calculated given their mean density.

Apparatuses of the invention also make it possible to perform desired measurements such as the diameter and the firmness or hardness of the objects at considerable speed, such as about five objects per second, which is compatible with and necessary for good efficiency in automatic sorting. This is done with a minimum of bruising or risk of damaging the fragile surfaces of said objects because of the relative rotary motion between each presser shoe and each object and because of the rounded shape of said shoe, against which the object can thus roll, at best without friction and thus with minimum risk of damage.

In addition, since the measurements are performed on each object, they can be sorted individually in optimum manner, and by using the option of placing a plurality of sensors and supports in series with all of the objects going past each of them, the successive measurements performed on each object can be combined so as to eliminate those measurements that relate to unrepresentative points on the objects, e.g. the stalk of a fruit, or so that the measurements can be averaged so to be representative of the shapes of objects that are only approximately bodies of revolution and that are not genuinely symmetrical, as applies in particular with objects that are natural products.

It may also be emphasized that these measurement apparatuses are applicable to objects of all types, and that the same conveyor system may be used for conveying varieties of objects that differ in shape and firmness, for example. It suffices merely to adapt and change the characteristics of the firmness sensors or the criteria on which sorting selection are based, as a function of the variety of object in question.

Sorting criteria can be adjusted in the calculation units by appropriate programming, in which case any changeover can be performed very quickly.

Finally, although the present invention is described mainly in its application to measuring the diameter and the firmness, essentially of fruit, apparatuses of the invention can be adapted to any type of object and also to any other type of measurement, and essentially measurements requiring direct contact with the objects. In particular, optical fibers may be mounted on the shoes in order to obtain spectroscopic information about the objects (color, humidity, sugar content of the fruit, etc.), or else detectors may be installed for picking up energy passed through the object, e.g. laser light, vibration, etc. . . . .

Apparatus of the invention can thus be described as being multisensor apparatus and is suitable for being adapted to numerous utilizations.

An evaluation system has been built on a packing line for fruit such as peaches and nectarines and including the apparatus as described below, the system serving to measure firmness in order to sort the fruit into three classes ($<6$ kg/cm$^2$; 6 to 12 kg/cm$^2$; $>12$ kg/cm$^2$). At a rate of three fruit per second, the performance was 88% of fruit properly sorted and no fruit remained unclassified. In addition, few of the fruit were marked, only the ripest fruit bearing slight traces due to the measurements, thus showing that the system satisfies the harmlessness constraints that constitute one of the objects of the invention.

Other advantages of the present invention could be mentioned, but those mentioned above already suffice to demonstrate the novelty and usefulness of the invention.

The following description and drawings relate to embodiments of the invention but are not limiting. Other embodiments are possible within the scope and the ambit of the present invention, in particular using other types of sensor for performing non-destructive measurements, and for application to objects of other types.

BRIEF DESCRIPTION OF THE DRAWINGS

An embodiment of the invention is described by way of example with reference to the accompanying drawings, in which.

DETAILED DESCRIPTION

Figure 1:
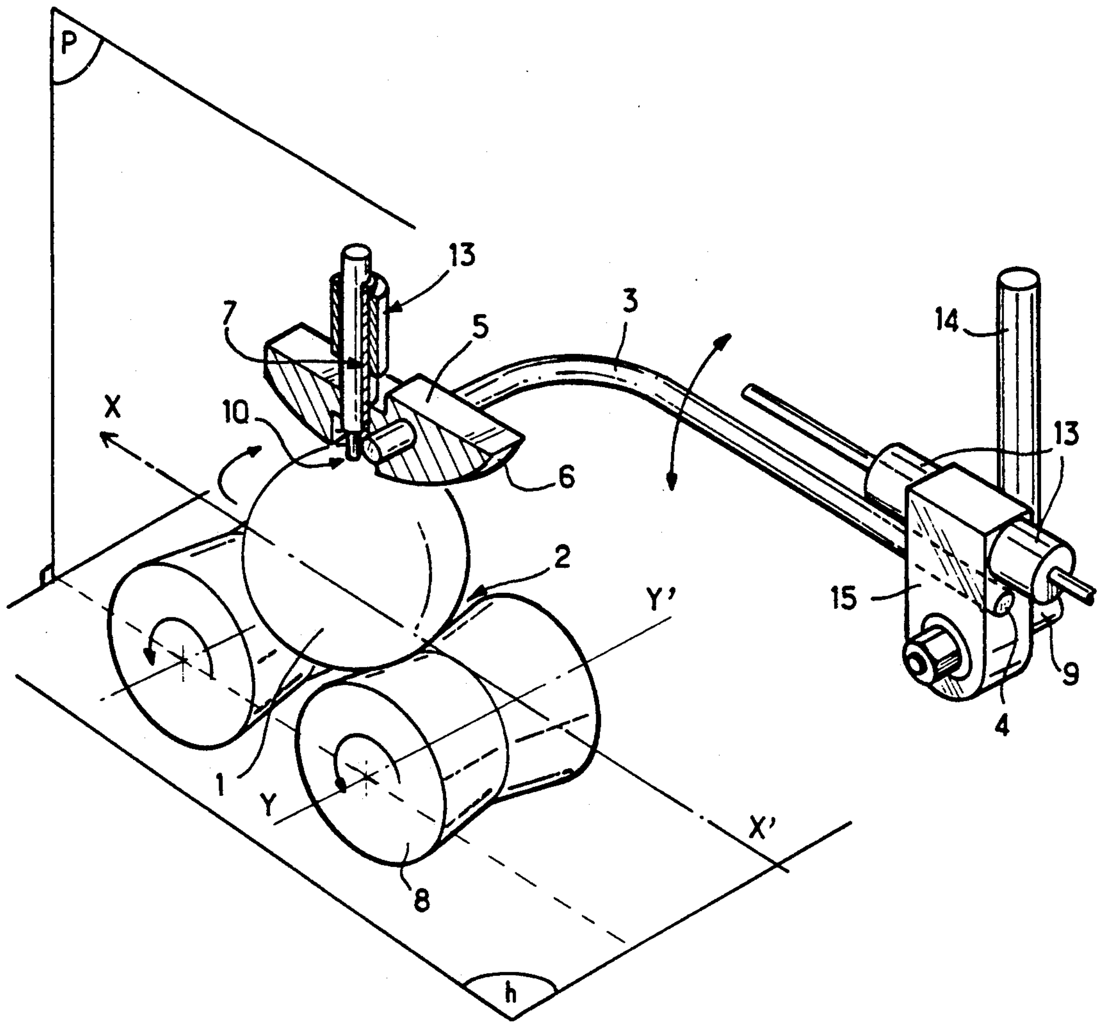
FIG. 1 is a perspective view of apparatus of the invention.

FIG. 1 is a perspective view of apparatus for performing non-destructive measurements on fragile objects 1 of non-uniform size and shape, having an outside surface that is approximately in the form of a body of revolution about at least one axis, thereby enabling the objects to be rotated about such an approximate axis of symmetry, and in the example shown, the object is approximately spherical in shape (therefore having multiple axes of symmetry), the object being moved continuously on a conveyor system of the type having object-receiving cells 2 in which the objects are placed and driven one by one in a given vertical directional plane P.

The conveyor system preferably comprises an endless chain made up of waisted cylinders 8 that rotate about their respective axes yy' in the same direction as the direction xx' in which they are driven, the direction xx' lying at the intersection between the drive plane h of their axes of rotation and the midplane of said waisted cylinders, corresponding to the given directional plane P.

The gaps between the cylinders constitute the said cells 2 that receive the objects 1.

The said cylinders are rotated in such a direction that the generator lines forming their top portions advance in the same direction as the drive direction xx', so that their surfaces rotate objects supported by pairs of cylinders on either side of respective gaps 2 in a direction opposite to their direction of advance, such that the generator lines forming the top portions of the objects are driven backwards.

The measurement apparatus of the invention then includes at least one support arm 3 which is supported and hinged at one of its ends 4 by a suitable support 15 which may itself be mounted, for example, on a rod 14 for adjusting its height.

A shoe 5 is secured to the other end of said arm 3, and the bottom surface 6 of the shoe is cylindrical in shape, having generator lines perpendicular to said plane P, extending on either side of said plane and being situated above the conveyor system. For this purpose, for example, said arm 3 preferably includes a first portion adjacent to the end 4 extending parallel to the axis of the displacement direction xx', followed by a bend enabling the second end of the arm to extend perpendicularly to the first portion, with the shoe 5 being threaded over and fixed to said second end, extending perpendicularly thereto, and such that each of said objects 1 passing beneath the shoe lifts it and rolls by relative rotary motion beneath and against said surface 6.

In another embodiment, the said objects 1 could move without rotating about their own axes, being stationary relative to the conveyor, in which case the shoe 5 should rotate relative to the end of the support 3 so as to roll over the surface of an object 1 passing beneath it.

The measurement apparatus includes at least one sensor for performing a non-destructive measurement of a parameter or a characteristic of each of said objects 1 as the objects pass beneath the said shoe 5, with the height of the shoe being adjusted so that when it is at rest all objects 1 passing beneath the shoe necessarily lift it. This is achieved by adjusting the height of the shoe 5 and of the arm 3 relative to the support 14.

In the present embodiment, the objects 1 are rotated relative to the shoe 5, thereby making it possible for the shoe to be stationary relative to the arm 3. The speed at which the cylinders 8 are driven in the conveyor direction and the speed at which they are rotated are determined so that each object 1 is capable, at best, of rolling against the surface 6 of the shoe without friction, thereby limiting damage to the surface of the objects.

The shoe 5 contains a deformation sensor 7 whose active portion 10 projects on its own from the surface 6 in order to come into contact with the surface of the object 1 rolling against the surface 6.

In order to adjust the thrust force applied by said shoe on said objects, the support arm 3 includes means 13 for adjusting said thrust force said shoe passes against the object which lifts the shoe as it passes therebeneath and is subjected to a force equivalent to said thrust force.

Said adjustment means 13 may be counterweights mounted on a parallel shaft extending along the direction xx' on either side of the support 15 supporting the end 4 of the support arm 3, thereby making it possible to reduce or increase the weight applied by the support arm and the shoe 5 to the object 1.

Another adjustment means 13 could be mounted on the shoe itself in order to increase its weight, should that be necessary.

Figure 2:
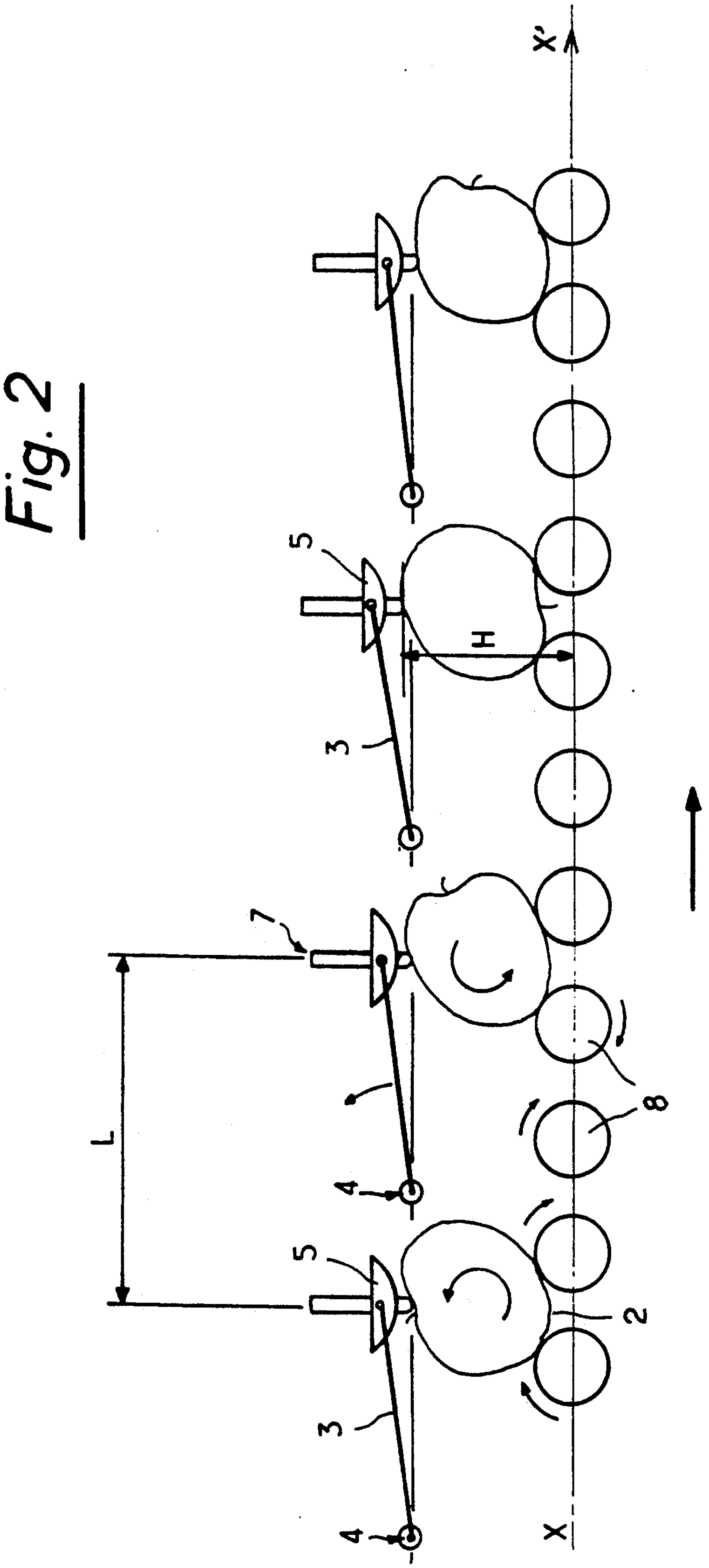
FIG. 2 is a diagrammatic profile view of apparatus including a plurality of supports.

FIG. 2 is a diagrammatic profile view of apparatus comprising a plurality of supports, including at least two arms 3 fitted with respective shoes 5, each having at least one measurement sensor. In FIG. 2, four support arms 3 are shown together with four shoes 5 disposed along the conveyor system which is constituted by waisted cylinders 8 advancing in the direction xx', said arms being situated at a distance L apart from one another such that by virtue of said objects 1 rotating as they travel through said distance L, the portions of their surfaces that roll beneath at least two consecutive shoes are different. Thus, by an appropriate choice of said distance L and an appropriate number of support arms, which number is preferably four, it is possible to discard measurements that may be taken on unrepresentative points of said objects, represented in the figure as being the points where the stalks are attached to the fruit, another kind of unrepresentative point would be a defect. Having four potential measurements available also makes it possible, even when no unrepresentative points are involved, to take the mean of at least two of the four possible measurements, particularly when the purpose of the measurement is to determine the mean caliber of each object.

The objects under consideration are approximately bodies of revolution, i.e. their sections need not be circular, but may be oval, egg-shaped, etc. as applies to pears, apples, peaches, and any fruit and vegetables that could be considered as being approximate bodies of revolution.

The apparatus may thus include a sensor for measuring the position H of each support arm 3 relative to the plane of advance of the conveyor cylinders, together with a calculation unit that receives the signals from the sensors, thereby making it possible to deduce the maximum height H or the mean of said maximum heights H to which the various shoes 5 are lifted as each of the objects 1 goes past.

Said measurement sensor is preferably a rotation angle sensor disposed at the end 4 of the arm 3, with the rotation measurement enabling the height H to be deduced given the length of the arm 3 and the position of the hinge axis at the end 4 relative to the reference plane of advance h of the conveyor.

Figure 3:
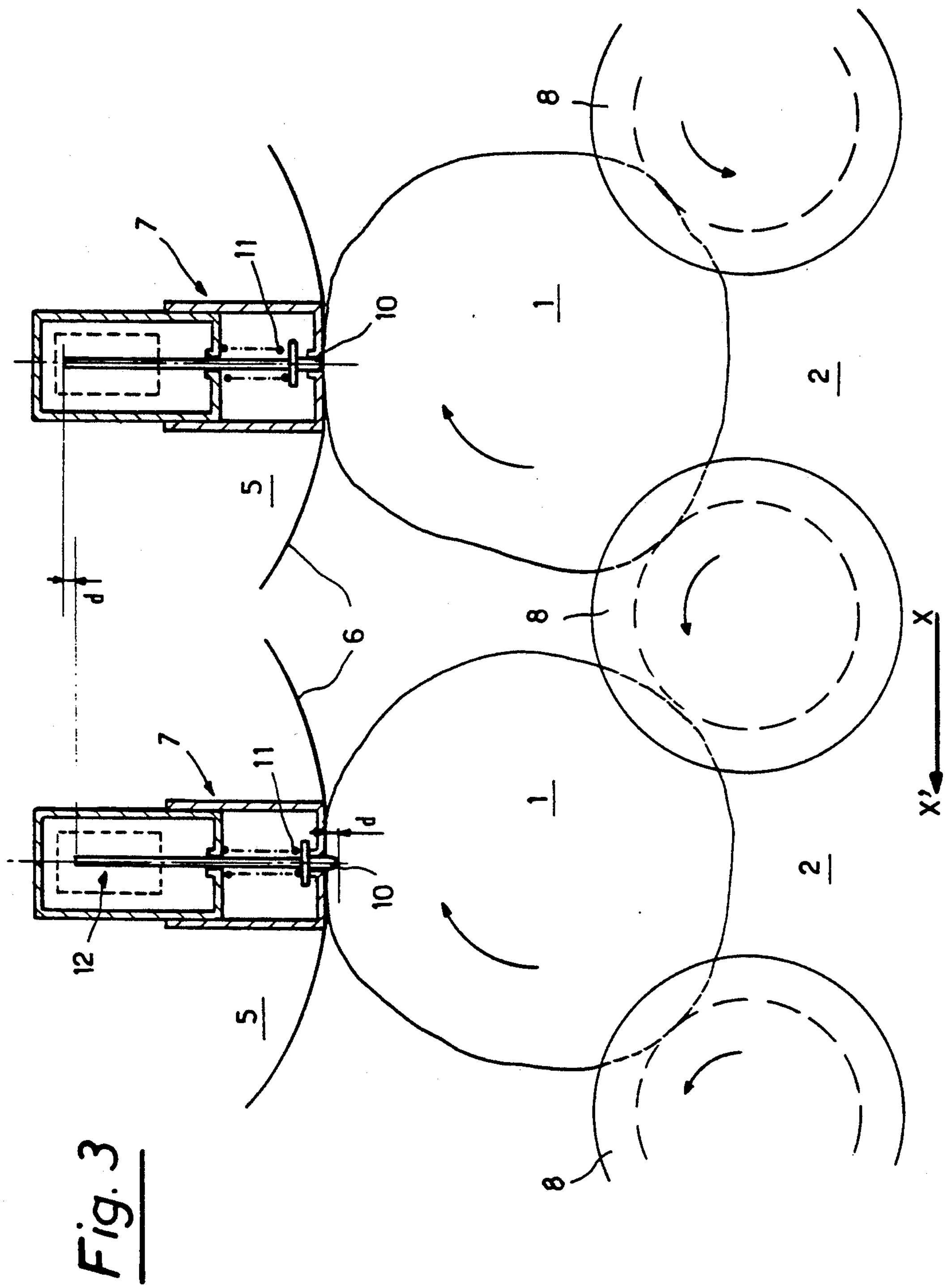
FIG. 3 is a fragmentary section through apparatus for measuring firmness.

FIG. 3 is a fragmentary section view on the plane P defined above with reference to FIG. 1 showing apparatus for measuring the firmness or the hardness of the objects 1, as already shown in part in FIG. 1.

In the preferred embodiment as shown, the deformation sensor 7 is a feeler whose active portion is a plunger 10 which includes a spring 11 preset to a given compression value, and a module 12 for measuring displacement of said plunger 10, and connected to a calculation unit (not shown).

Preferably, and in particular in applications concerning measuring the ripeness of fruit without running the risk of bruising the surface of the fruit, the maximum displacement of the plunger 10 is set to 0.5 mm and is equal to the extend d by which it projects relative to the surface 6 when at rest, the maximum diameter for the plunger tip is 8 mm, and its diameter is preferably 2 mm, and the maximum compression force preset by the spring 11 is 100 grams (g) for fruit, and it is preferably 70 g.

In FIG. 3, the object 1 shown in the lefthand portion of the figure corresponds, by way of example, to a fruit that will be classified as being soft since the plunger 10 penetrates into the fruit to the depth d corresponding to the maximum distance it projects from the shoe, i.e. the fruit provides less resistance than the initial setting of the spring 11. If this setting corresponds to fruit that needs to be rejected because of insufficient firmness, then failure to detect displacement of the plunger 10 is used as a criterion for rejecting the corresponding fruit. The fruit or object 1 shown on the righthand side of FIG. 1 is an example of a fruit that is very firm where the plunger 10 is fully retracted into the shoe 5 and therefore corresponds to an object whose firmness is greater than the value corresponding to said maximum retraction, this also may constitute a criterion for selecting fruit above said known predetermined value. In between these values, progress is linear.

Known sensor devices like the one shown are commercially available and enable forces to be measured with an accuracy of $\pm 10$ g for a spring setting in the range 50 g to 100 g, using a displacement sensor that is accurate to within about 1 micron, which corresponds to accuracy of about 1 gram in the measurement of firmness. In order to avoid marking the object 1, as mentioned above, depressions are kept to less than 0.5 mm, e.g. 0.3 mm. Under such circumstances, by way of example, discriminating peaches having a firmness of greater than 6 $kg/cm^2$ requires a force of 100 g for a flat tip and of 70 g for a spherical tip having a diameter of 3 mm.

A spherical tip is preferred since the fruit is less marked and less pressure needs to be exerted.

Numerous repetitive tests on apparatus of the invention have verified that the ripeness of a fruit, for example, can indeed be calculated on the basis of measuring such micropenetration of tips into the skin of the fruit, and that this can be done with reliability better than 80%, while conveying more than three fruit per second and with the marking of the fruit being practically invisible.

In order to provide further measurements and to satisfy sorting requirements, the apparatus of the invention also includes calculation units that analyze the signals emitted by each of said measurement sensors concerning size and/or firmness, such that the measurements can subsequently be processed by any known type of central unit associated with said conveyor system to select and organize the dispatch of said objects as identified on the conveyor system, delivering them to different outlets corresponding to given value criteria for the parameters as determined in this way on each object 1.

As mentioned above, any type of sensor that needs to make direct contact with said objects or that needs to be at a given distance therefrom can be integrated in said apparatus, either directly on the shoe 5, or on the surface 6 thereof, or at any point along the support arm if the measurement is performed remotely, but in which the notion of direct contact with said objects is retained by what may be called a "feeler". The measurement itself is performed indirectly, but some point of the apparatus is nevertheless in direct contact with the object even if the sensor is not in direct contact, merely being secured relative to the surface 6 which, in the present invention, always makes contact with the object 1.

In combination with the speed of rotation of the driving cylinders 8 and their speed of advance, the curvature of the surface 6 of the shoe 5 may be determined as a function of the mean, minimum, and maximum diameters of the shapes of the approximate bodies of revolution constituted by the objects 1 that are to roll beneath the surface 6, so as to obtain best possible rolling without friction of said objects against said surface.

It is necessary for the fruit to rotate relative to said shoe 5 not only to eliminate or reduce bruising associated with measuring firmness, in accordance with one of the main objects of the present invention, but also to prevent the objects 1 bouncing backwards when they come into contact with said shoe 5.

We claim:

1. Measurement apparatus for performing non-destructive measurements on fragile objects of non-uniform size and shape that are generally in the form of bodies of revolution about at least one axis and that are moving continuously on a conveyor system of the type including object-receiving cells in which said objects are placed and driven one by one along a given directional plane, the measurement apparatus comprising:

at least one support arm which is stationary and hinged at one end;

a shoe secured to the other end of said arm and having a bottom surface in cylinder form, generator lines of which are perpendicular to a directional plane, said shoe extending on either side of said directional plane, whereby said shoe may be situated above a conveyor system that drives objects along said directional plane such that each of said objects lifts the shoe and rolls by relative rotary motion beneath and against said surface; and at least one sensor at said surface for enabling a non-destructive measurement to be performed of a parameter of each of said objects as it moves past beneath said shoe.

2. Measurement apparatus according to claim 1 and such that the conveyor system comprises an endless chain constituted by waisted cylinders which rotate in the same direction as their drive direction, with the gaps between the cylinders constituting said cells receiving the objects, the objects thus being advanced and being rotated in the opposite direction to their direction of advance, said shoe being fixed relative to said arm, and the speed of advance and the speed of rotation of the cylinders being such that each object rolls against the surface of the shoe.

3. Measurement apparatus according to claim 2, including at least two support arms fitted with respective shoes, and at least one measurement sensor each, said arms being disposed along the conveyor system at distances apart such that the rotation of said objects while travelling said distances ensures that different portions of their surfaces roll against at least two of said shoes.

4. Measurement apparatus according to claim 1, including a sensor for measuring the position of the support arm relative to the drive plane of the conveyor system, a calculation unit receiving the signal from said sensor and serving to deduce the maximum height to which said shoe is raised each time an object goes past it.

5. Measurement apparatus according to claim 4, in which said measurement sensor is an angle of rotation sensor fixed to the end of the arm.

6. Measurement apparatus according to claim 1, including a deformation sensor situated in said shoe and having an active portion that projects on its own from said surface.

7. Measurement apparatus according to claim 6, in which the deformation sensor is a sensor whose active portion is a plunger and which includes both a spring preset to a given compression value and a module for measuring displacement of said plunger connected to a calculation unit.

8. Measurement apparatus according to claim 7, in which the maximum displacement of the plunger is 0.5 mm and is equal to the extent to which it projects from the surface when at rest, its tip having a diameter of not more than 8 mm, and the compression force to which the spring is preset not exceeding 100 g.

9. Measurement apparatus according to claim 1, including calculation units analyzing the signals emitted by each of said measurement sensors enabling them subsequently to be processed by a central unit which operates in known manner to select and organize the dispatching of said objects identified while on the conveyor system to different outlets corresponding to given value criteria for the parameters determined in this way on each object.

10. Measurement apparatus according to claim 1, in which said support arm includes means for adjusting the thrust force with which said shoe is pressed against the objects passing beneath it and lifting it, thereby exerting and being subjected to a force equivalent to said thrust force.

* * * * *